July 30, 1940.                    A. TSCHERNE                    2,209,493
CENTERING POINT FOR LATHES, GRINDING MACHINES, AND THE LIKE
Filed July 1, 1939
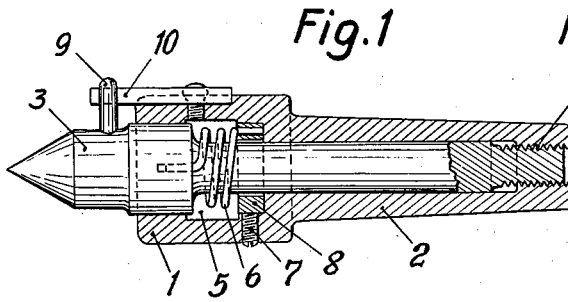
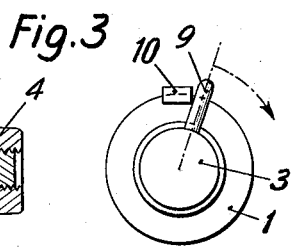
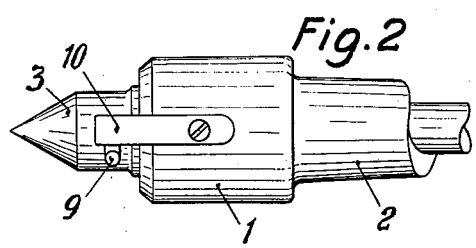
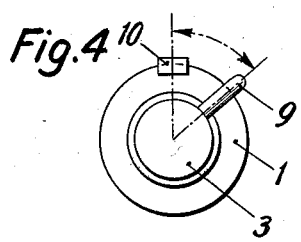
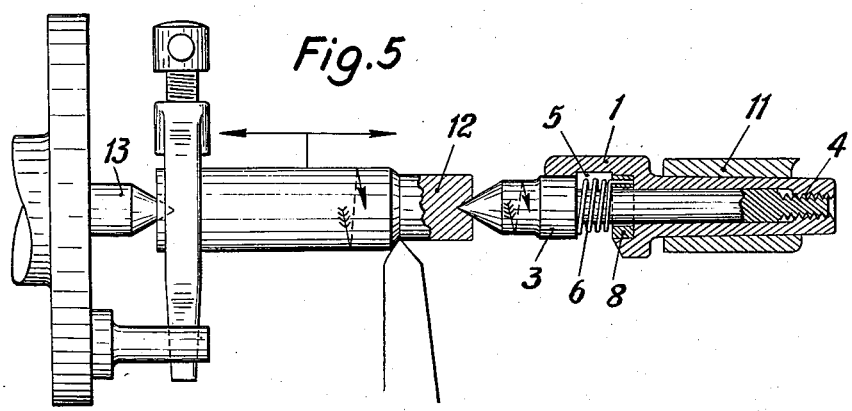
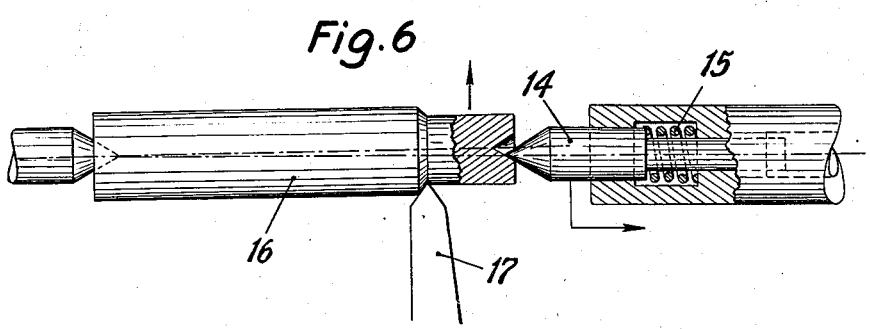
Inventor:
Alois Tscherne Patented July 30, 1940

2,209,493

UNITED STATES PATENT OFFICE 2,209,493

CENTERING POINT FOR LATHES, GRINDING MACHINES, AND THE LIKE

Alois Tscherne, Rorschach, Switzerland

Application July 1, 1939, Serial No. 282,397
In Germany May 19, 1938

3 Claims. (Cl. 82—33)

This invention relates to centering points, having an automatic regulation of the axial pressure, for lathes, grinding machines and the like.

Owing to the heating which occurs on machining, the work pieces undergo an expansion. This alteration in the dimensions manifests itself to a disturbing extent especially in the case of work pieces which are fixed for machining between points, as is frequently the case in, for example, lathes, grinding machines and the like. The increase in the length of the work piece on account of the heating by the machining manifests itself by a great increase of the axial pressure on the working spindle which results in a more difficult operation of the machine tool. It may even be so great that the machine tool is stopped if the operator neglects to loosen or release the lathe point somewhat. Owing to the employment of modern rapid steels or hard bodies, such as have become known under the name of "Widia", which allow of very high cutting speeds and, therefore, naturally result in a still more rapid and greater heating of the work piece, this disadvantage is increased still further and cannot be avoided entirely even with the employment of large quantities of a cooling liquid. Since the adjustment of the correct pressure of the point on the work piece has to be effected by feeling and by hand, there often occur defects which lead either to a poor result in the work or to an excessive straining of the bearings of the machine tool. Now, it has already been proposed to make the centering point resilient by means of springs or hydraulically. However, a great deal cannot be achieved in this way, since, in order to prevent the work piece from being pressed away from the point under the action of the pressure that is exerted laterally by the machine tool, the pressure of the spring must, to commence with, be so great that the effect intended cannot be obtained.

The subject matter of the present invention is a centering point having an automatic regulation of the axial pressure, for lathes, grinding machines and the like in which the dead center is connected in such a manner by a screw-thread with a casing in which it is rotatably mounted that it is axially displaced when it turns in the casing and that between this casing and the dead center there is arranged a torsion spring which regulates the axial pressure and tends to turn the dead center into a position of rest.

In contradistinction to the dead centers which have hitherto been usual and which are rigidly connected with the spindle of the tailstock and are adjustable by hand, the essential feature of the centering point according to the invention consists in the fact that it adjusts itself completely and automatically to the desired axial pressure in accordance with the variations of the axial pressure which occur during the machining of the work piece, so that a harmful jamming of the work piece between the points cannot occur. From this there result (1) a great facilitation of the work for the operators of the machine tool and better outputs by reason of the fact that it is superfluous for the operators to supervise the axial pressure during the working, (2) a considerable saving of power, since a braking action, which would be produced by a too powerful clamping of the work piece between the points, cannot occur and (3) a very great preservation of the spindle bearings of the machine tool, of the rotating arbor and of the centering point, because these parts are subjected only to slight wear on account of the avoidance of a too great axial pressure and corrosion is avoided.

An example of embodiment of the subject matter of the invention is represented in the accompanying drawing, of which:

Fig. 1 is a longitudinal section through a centering point, having an automatic regulation of the axial pressure, for lathes, grinding machines and the like;

Fig. 2 shows a part in plan;

Fig. 3 shows the centering point in end view in one working position and

Fig. 4 shows it in end view in another working position;

Fig. 5 is a representation of the mode of operation of a centering point according to the invention; and Fig. 6 is a comparison with the mode of operation of a resilient centering point.

The centering point has a casing 1 with a conical shank 2 for inserting into the tail spindle of a machine tool. In this casing 1 there is mounted a dead center 3 which has, on its rear end a screw-thread 4 which is screwed in such a manner into a female thread, which is provided at the rear end of the casing 1, that, when the dead center 3 turns in the casing 1, an axial displacement of the dead center 3 in the casing 1 results. In the front part of the casing 1 there is provided a chamber 5 in which there is accommodated a torsion spring 6 one end of which is connected with the head of the dead center 3 and the other end of which is connected with an adjusting ring 8 which is mounted in the casing 1 and can be fixed therein by means of a set screw 7. A stop 9 is provided outside the casing 1 on the head of the dead center 3 and a stop 10 is provided on the casing 1. The torsion spring 6 rotates the dead center 3 in the casing 1 until the stop 9 rests on the stop 10.

The centering point according to the invention is inserted into the tail spindle 11 of a machine tool and the work piece 12 is placed between the dead center 3 and the fixing point 13 of the machine tool. After being pressed on, the tail spindle 11 is made fast, the axial pressure on the work piece being intentionally made somewhat too great. Now, if the machine tool is set into operation, then, owing to the high axial pressure of the rotating work piece 12 in opposition to the action of the torsion spring 6, which now regulates the axial pressure, the dead center 3 is rotated somewhat along with the work piece, with the result that the screw-thread 4 on the rear end of the dead center 3 is, correspondingly, screwed more into its female thread which is provided in the casing 1; the result of this is an axial displacement of the dead center 3 in the casing. This manifests itself externally by the removal of the stop 9 of the dead center 3 from the stop 10 of the casing. The correct axial pressure is obtained when the torsion spring 6 prevents the dead center from turning further. The operator of the machine tool does not now have to concern himself any more with the further regulation of the axial pressure.

When the work piece expands on account of the heating that occurs on the machining, the axial pressure on the dead center 3 increases. In this way, the latter is turned further in opposition to the action of the torsion spring 6, so that it is displaced in the casing 1 in accordance with the expansion of the work piece. When the work piece again contracts owing to cooling, which is caused, for example, by interruption of the machining, the axial pressure between the dead center 3 and the work piece 12 decreases. However, before a loosening could occur, the tensioned torsion spring turns the dead center 3 back, with the result that its screw-thread 4 is correspondingly screwed out of the female thread in the casing 1; this results in a displacement of the dead center 3 in the casing 1 until the desired axial pressure is obtained. These operations proceed without any delay. The desired axial pressure, which is dependent merely upon the force of the torsion spring 6, the initial tension of which can be adjusted with the aid of the adjusting ring 8 and the set screw 7, is consequently always maintained.

It is of the greatest importance that the axial pressure, which is exerted on the dead center 3, is not taken up by the torsion spring 6 but by the female thread in the casing 1 into which the dead center 3 is screwed. In the case of the known resilient lathe points, such as, for example, the one illustrated in Fig. 6, the spring 15, which acts upon the dead center 14, must take up the whole of the axial pressure. Now, if this axial pressure is comparatively small, there is a danger that the work piece 16 will, under the action of the laterally acting pressure of the tool 17, which may be very considerable, be pushed away from the dead center 14—i. e., that this dead center 14 will be pushed back in opposition to the action of the spring 15 and the work piece 16 will, as shown in Fig. 6, be pushed out of its centered position. Naturally, this would have disastrous consequences on the result of the work. Consequently, the axial pressure must be made so high to commence with that the action of the resilience of the dead center 14 is weak for the greater part. Such a pushing back of the dead center is impossible in the case of the centering point according to the invention, because the axial pressure is, in this case, completely transmitted by the screw-thread 4 of the dead center 3 to the female thread of the casing 1, but the torsion spring 6, which attends to the regulation of the axial pressure, cannot be influenced by forces which act laterally on the work piece.

The casing 1 can, as shown, be formed with a Morse cone for insertion into the tail spindle of a machine tool. However, the tail spindle itself may form the casing 1.

What I claim is:

1. For lathes, grinding machines and the like, a dead center, a casing in which said dead center is mounted, a screw-thread on said dead center and connecting said dead center with said casing and effecting the displacement of said dead center when said dead center turns in said casing, and a torsion spring, arranged between said casing and said dead center, for regulating the axial pressure of said dead center on the work piece.

2. For lathes, grinding machines and the like, a dead center, a casing in which said dead center is mounted, a screw-thread on said dead center and connecting said dead center with said casing and effecting the displacement of said dead center when said dead center turns in said casing, a torsion spring, arranged between said casing and said dead center, for regulating the axial pressure of said dead center on the work piece, and, on said dead center and said casing respectively, stops for fixing the position of rest of said dead center.

3. For lathes, grinding machines and the like, a dead center, a casing in which said dead center is mounted, a screw-thread on said dead center and connecting said dead center with said casing and effecting the displacement of said dead center when said dead center turns in said casing, a torsion spring, arranged between said casing and said dead center, for regulating the axial pressure of said dead center on the work piece, an adjusting ring in said casing, one end of said torsion spring being fixed in said adjusting ring, and a set screw for fixing said adjusting ring.

ALOIS TSCHERNE.